(12) United States Patent
Elmquist

(10) Patent No.: US 6,947,058 B1
(45) Date of Patent: Sep. 20, 2005

(54) INCREMENTAL UPDATE OF GRAPHICAL IMAGES WHEN USING ANTI-ALIASING TECHNIQUES

(75) Inventor: Kells A Elmquist, Lansing, NY (US)

(73) Assignee: Autodesk, Inc., San Rafael, CA (US)

( * ) Notice: Subject to any disclaimer, the term of this patent is extended or adjusted under 35 U.S.C. 154(b) by 315 days.

(21) Appl. No.: 10/146,847

(22) Filed: May 15, 2002

Related U.S. Application Data

(60) Provisional application No. 60/293,109, filed on May 22, 2001, and provisional application No. 60/291,947, filed on May 18, 2001.

(51) Int. Cl.$^7$ ................................................. G09G 5/00
(52) U.S. Cl. ....................................... 345/611; 345/582
(58) Field of Search .................... 345/582, 611–619, 345/418, 428, 589; 348/384.1; 382/167

(56) References Cited

U.S. PATENT DOCUMENTS

| | | | | |
|---|---|---|---|---|
| 6,005,580 A | * | 12/1999 | Donovan | 345/428 |
| 6,456,291 B1 | * | 9/2002 | Fowler | 345/582 |
| 6,661,463 B1 | * | 12/2003 | Geshwind | 348/384.1 |
| 6,664,955 B1 | * | 12/2003 | Deering | 345/418 |
| 2002/0005862 A1 | * | 1/2002 | Deering | 345/694 |

OTHER PUBLICATIONS

Heckbert, Paul S., "Survey of Texture Mapping," IEEE Computer Graphics and Applications, Nov. 1986, pp. 56–67.*

* cited by examiner

Primary Examiner—Matthew C. Bella
Assistant Examiner—A Brautigam
(74) Attorney, Agent, or Firm—Moser Patterson & Sheridan LLP

(57) ABSTRACT

An approach for incrementally updating graphical images when using anti-aliasing techniques is disclosed. Data for an original color is stored, and an image is filtered based on the original color. A new color for an image portion less than the entire image is identified. The new color is used with the old color to re-filter the image portion. The re-filtering may be performed by a two-step approach in which the image portion is filtered using the negative of the original color and then the image portion is filtered using the new color. The re-filtering may be performed by a one-step approach in which the portion of the image is filtered using the difference between the new color and the old color. The appearance of a halo around the portion of the image that would otherwise occur when filtering based on only the new color is thereby avoided.

35 Claims, 10 Drawing Sheets

(2 of 10 Drawing Sheet(s) Filed in Color)

INCREMENTAL UPDATE OF GRAPHICAL IMAGES WHEN USING ANTI-ALIASING TECHNIQUES

RELATED APPLICATIONS

This application claims domestic priority from both prior U.S. Provisional Patent Application Ser. No. 60/293,109, filed on May 22, 2001, titled "A MECHANISM FOR CONTENT AND DESIGN LAYOUT," naming as inventors Nikolai Sander, Scott Morrison, Britt Miura, Kells Elmquist, John Wainwright, Michael Malone, and Frank Delise, and from prior U.S. Provisional Patent Application Ser. No. 60/291,947, filed May 18, 2001, titled "CONTENT LAYOUT AND DESIGN MECHANISM," naming as inventors Nikolai Sander, Scott Morrison, Britt Miura, Kells Elmquist, John Wainwright, Michael Malone, and Frank Delise, the entire disclosures of both of which are hereby incorporated by reference for all purposes as if fully set forth herein.

FIELD OF THE INVENTION

The present invention relates to computer graphics, and more specifically, to the incremental update of graphical images when using anti-aliasing techniques.

BACKGROUND OF THE INVENTION

In computer graphics, digital pictures are represented as a grid of individual color dots called "pixels." The entire grid is called the "raster image" or simply the "raster." The process of creating a raster image is called "rasterization" or "rasterizing" the image. The raster image displays a scene that typically includes one or more objects that are each comprised of sets of one or more pixels. The objects may be three-dimensional objects that are rendered for display in two dimensions. Several types of operations may be performed on the objects including, but not limited to, hidden surface removal, application of texture, lighting, shadows, and animation.

Although the raster image displays individual pixels, the characteristics of an individual pixel may be represented or evaluated by a grid of subpixels when performing graphical manipulations and calculations. As used herein, a "subpixel" is a portion of a pixel. For example, a graphics application may use an 8×8 subpixel grid to represent and evaluate each pixel.

The creation and manipulation of high quality images in computer graphics involves considerable computations, particularly if the entire raster image is being rendered. One trend in computer graphics for improving performance is to render only a portion of the entire image. For example, only a particular object, a particular set of objects, or a defined portion of a raster image is rendered, thereby using fewer computational resources. The re-rendering of only a portion of the raster image instead of rendering the entire raster image is referred to as "incremental updating" of the raster image. In certain cases, incremental updating may involve re-applying a particular type of effect, such as a change to the shading or lighting in the raster image, a change to a particular material within the raster image, or the re-rendering of just a defined portion of the raster image.

Although each pixel in a raster image can display only a single color, two or more objects or effects in a scene may geometrically cover a portion of the area represented by a pixel. The portion of each object or effect that covers some or all of the area represented by the pixel is called a "fragment." Each fragment is typically associated with a set of information that is related to the fragment. For example, the set of information for a fragment typically includes, but is not limited to, the following types of information: the location of the fragment; the surface normal of the fragment at the location; the opacity of the fragment (e.g., how transparent the fragment is); a pointer back to the geometry of the object that the fragment is associated with, such that material properties and other features stored in data that is associated with the object may be identified with the fragment; and a sub-pixel mask that indicates which sub-pixels of a pixel are covered by the fragment.

A fragment may be "visible" or "not visible." For example, an object that is placed in front of or on top of another object is visible, whereas an object that is behind or under another object is not visible. Each fragment may be "transparent," for example, for shading or lighting effects, thereby allowing the transparent fragment to contribute to the visible image of the object. Transparent layers are "composited" together as part of determining the final color for the pixel that is displayed in the raster image.

Conventionally, a rendering application may employ a rendering engine that operates in two phases: (1) an initialization phase where a fragment buffer is created and (2) an update phase where the fragment buffer is scanned to determine shading and other effects for the raster image. The fragment buffer stores the fragment information for each visible fragment in the raster image.

Often, a raster image may depict jagged edges for objects that overlap other objects at a particular pixel. For example, when determining the color to be used in the raster image for a particular pixel, the color of the object having the largest fragment for the particular pixel may be used. However, a drawback with this approach is that it may result in a jagged or stair-stepped appearance of the edges of the object. This jagged edge effect is called "aliasing."

Because of aliasing, another trend in computer graphics is the use of anti-aliasing techniques to remove the stair-stepped appearance of object edges. Certain anti-aliasing techniques include the application of an "anti-aliasing filter" or simply a "filter." For example, by applying an anti-aliasing filter to the pixels of a particular object, the colors of adjacent objects along the particular object's edge are combined or blended with the color of the particular object such that the resulting raster image shows a smooth edge for the particular object instead of a jagged edge. The use of such anti-aliasing filters is referred to as "filtering," and the object images that have been filtered are referred to as "filtered images".

For example, FIG. 1 is a diagram that depicts a pixel grid 110 and a filter 130 that are centered on an output pixel 120. Filter 130 extends for two pixels on all sides of output pixel 120 producing a 5×5 block of pixels that is covered by filter 130, which in this case is a pyramid filter. Assuming there is an X-Y coordinate system with the output pixel at coordinates (10,10), the 5×5 block of pixels covers pixels in a block from (8,8) to (12,12). While FIG. 1 depicts a filter covering a 5×5 block of pixels, any type of filter covering one or more pixels may be used.

During filtering, each pixel in the 5×5 block is examined and all visible fragments are weighted by the "strength" of filter 130 at the particular distance from the center of filter 130. A filter's strength, or "weight," at a particular location is a mathematical scalar value that is associated with a filter at the particular location. In FIG. 1, the strength of filter 130 at a given location is represented by the height of filter 130 above pixel grid 110 at the given location. The shape of filter 130 as depicted in FIG. 1 may be referred to as the "kernel" or "hat" of filter 130.

Colors in computer graphics are typically represented by a triple of scalar values, each in the range between 0.0 and 1.0. The triple is organized as ( r, g, b ) where "r" refers to the red component, "g" to the green component, and "b" to the blue component. In this representation, white is (1, 1, 1), black is (0, 0, 0), full red is (1, 0, 0), dark blue-green is (0, 0.2, 0.2), etc.

For example, assume a pixel 122 that is located at coordinates (11,9) has only the color red, which is represented as (1, 0, 0). If the strength of filter 130 at pixel 122 is 0.2, then the weighted color of pixel 122 is (0.2, 0, 0) (e.g., 0.2×1.0=0.2; 0.2×0.0=0.0; 0.2×0.0=0.0). A weighted color for each of the other pixels covered by filter 130 in pixel grid 10 are similarly generated by multiplying the color of each pixel by the strength of filter 130 at the location of the pixel.

While FIG. 1 depicts a filter with weighting that is based on a pyramid shape, other filters that are associated with different weightings may be used, such as a flat square, a circular cylinder, a curved shape based on a cubic spline, or virtually any other specified shape. Generally, filters are center-dominant such that pixels that are closer to the center of the filter have a greater weight than those pixels further away from the center of the filter, resulting in a peaked shape such as that of filter 130. However, other filters that give more weight to farther pixels than closer pixels or filters that have a uniform weighting scheme may also be used, and filters that are not center-dominant may be used. Some filters may include both positive and negative weights.

Conventionally, to determine the final color for output pixel 120, the weighted colors for the pixels covered by filter 130 are summed together. The values of filter 130 are typically normalized so that the sum of the weighted colors for the pixels under the hat of filter 130 represents the final color for output pixel 120. For example, if a filter covers a 3×3 block of pixels and the filter is uniform, the weight for each pixel is 1/9, or 0.1111, and the sum of the weights for the pixels is 1 (e.g., 9×0.1111=1). Alternatively, the filter values may not be normalized initially, and therefore the final summed color is normalized based on the sum of the initial filter values to determine the final color for an output pixel. Generally, filter values typically range from −1 to 1, although other ranges may be used as well.

The process of applying weights to the colors and summing them together is called "convolution." Convolution may be done at a variety of levels of resolution, such as at the pixel level or at the subpixel level. Generally, the lower the level of resolution, the higher the quality final raster image, although the higher quality is achieved at the expense of more calculations.

Although the example of FIG. 1 is described in terms of objects having a particular color, in general, each pixel or subpixel may be covered by several fragments that contribute to the pixel's final appearance. For example, when portions of more than one object is visible within a pixel, there will be one fragment for each object within the pixel, and the sub-pixel masks will resolve the relative occlusion between the objects. The final appearance of a pixel is then "gathered" from all of the fragments in each of the pixels covered by the filter.

FIG. 2 is a diagram that depicts pixel grid 110, a red object 240, a white object 250, and an edge 260 between red object 240 and white object 250. In the example of FIG. 2, edge 260 is oriented such that half of output pixel 120 is covered by red object 240 and half of output pixel 120 is covered by white object 250. When filter 130 is applied to red object 240, each pixel in red object 240 is filtered using a 5×5 block of pixels centered on each pixel. For example, all of the pixels in the 5×5 block from (8,8) to (12,12) will be used to calculate the final color of output pixel 120 at (10,10). Because the 5×5 block encompasses pixels within both red object 240 and white object 250, when the 5×5 block is near edge 260, the final color of output pixel 120 will be influenced by both the colors red and white.

Further, each pixel will affect neighboring pixels when the neighboring pixels are filtered. For example, the original red half and the original white half of output pixel 120 at (10,10) will affect the color of pixels up to two pixels away when the filter is applied to those pixels. For example, when a pixel 124 that is located at (12,10) is filtered, the filter centered over that pixel covers the 5×5 block (10, 8) to (14, 12) and output pixel 120 at (10,10) falls within the block. Conversely, pixel 124 and any pixels that are filtered in the 5×5 block within red object 240, from (10,8) to (12,12), will be somewhat affected by the original red half and white half of the output pixel 120 at (10,10).

By using filter 130, the colors from the objects bordering edge 260 become mixed or blended, resulting in a smoother, higher quality border around red object 240 that reduces the jagged edge appearance that typically occurs when anti-aliasing filters are not used. After red object 240 is filtered, the new filtered colors for each pixel are retained and the original colors for each pixel and subpixel are discarded.

Filter 130 may be applied at any of a variety of resolutions, such as that of the pixels of pixel grid 10 or of a subpixel grid within each pixel, such as a subpixel grid 230 depicted in FIG. 2 as having a 4×4 grid of subpixels. Although the use of a subpixel grid will require more computations, the final raster image will have a higher quality than if only a single pixel level of resolution is used.

FIG. 3A is a diagram that depicts a scene 310 that has been filtered. Scene 310 includes a red box 320 that is positioned on a white table 330. An edge 340 shows the border between red box 320 and white table 330. As a result of applying a filter to red box 320, edge 340 appears as a smooth edge instead of jagged edge.

FIG. 3B is a diagram that depicts a magnified view of a portion of edge 340 of red box 320 after application of the filter to red box 320. FIG. 3B depicts the color of individual pixels that are represented by small squares. The squares along edge 340 show various blended colors, such as lighter shades of reds and some pinkish colors, between the red color of red box 320 and the white color of white table 330, which results in the smooth appearance of edge 340 in FIG. 3A.

Conventionally, a problem arises with using a graphics application to incrementally update a selected object when using anti-aliasing filters, namely that a "halo" effect often appears when the appearance of an object is incrementally updated. For example, referring back to FIG. 2, assume that the color of red object 240 is changed to blue, and that prior to the color change, the anti-aliasing filter used the original red color of red object 240 when selecting the color for the pixels along edge 260 between red object 240 and white object 250. In conventional systems, once the filter is applied to the red object, the original color information is discarded. Thus, only the filtered colors for the pixels along edge 260 are maintained. Therefore, when red object 240 is re-rendered to change the color to blue, without re-rendering white table 330, filter 130 is applied again using the blue color of the pixels and subpixels of red object 240 (which is now blue in color, not red) along edge 260. Because white object 250 object was not re-rendered, filter 130 must use the previously filtered colors where white object 250 was present. These pixels, however, still retain traces of the previous filtering of red object 240 before the color change. Hence both the original red color of red object 240 and the new blue color for red object 240 will influence the refiltered pixels along edge 260. The result is a purple (blue+red) halo around re-rendered red object 240 that now has the blue color. In FIG. 2, the halo effect would appear in the block of pixels within red object 240 that is defined by pixels (10,8) and (12,12) since those pixels will be influenced by the pixels along edge 260 when filter 130 is used.

Moreover, if red object 240 (now with the color blue) is re-rendered and re-filtered again due to other changes, such as different shading effects, a further contribution of the original red color is added, which magnifies the halo effect. Thus, as red object 240 is repeatedly refiltered, the purple halo becomes brighter and more noticeable.

One approach for removing the halo effect is to re-render the entire raster image so that there are no contributions from previous colors. However, such an approach requires considerable computations and defeats the purpose of the incremental update technique, which is to render less than the entire image to improve performance. Another approach for removing the halo effect is to forgo the use of the anti-aliasing filters. However, this approach results in the appearance of jagged edges around the objects shown in the raster image, thereby degrading the quality of the objects shown in the raster image.

Based on the foregoing, it is desirable to provide improved techniques for incrementally updating graphical images when using anti-aliasing techniques.

SUMMARY OF THE INVENTION

Techniques are provided for incrementally updating graphical images when using anti-aliasing techniques. According to one aspect of the invention, a method for generating part of an image based on an original color and a new color is described. Data for the original color is stored, and an anti-aliasing technique is applied to some or all of the image. Based on a change to an object, a set of objects, or some other portion of the image that is less than the entire image, a new color is identified. The portion of the image is re-filtered based on the original color and the new color, thereby precluding the appearance of a halo effect around the re-filtered parts of the image that may otherwise occur if only the new color is used when re-filtering.

According to another aspect of the invention, the re-filtering is performed in a two-step approach. In the first step, a negative color of the original color is used when filtering the specified portion of the image. In the second step, the new color is used when filtering the specified portion of the image.

According to another aspect of the invention, the re-filtering is performed in a one-step approach. The difference color is determined based on the new color less the old color or the sum of the new color and the negative of the old color. The difference color is used when filtering the specified portion of the image.

According to another aspect of the invention, an apparatus for generating an image based on an original color and a new color is described. A storage mechanism stores original color data. A first filter is applied based on the original color. Based on a change to some portion of the image that is less than the entire image, a new color is identified by an identification mechanism. A second filter is applied to the portion of the image based on the original color and the new color.

According to other aspects, additional methods, apparatuses, and computer-readable media that implement the approaches above are described.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The present invention is depicted by way of example, and not by way of limitation, in the figures of the accompanying drawings and in which like reference numerals refer to similar elements and in which.

DETAILED DESCRIPTION OF THE INVENTION

A method and apparatus for performing incremental updates within graphical images when using anti-aliasing techniques is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are depicted in block diagram form in order to avoid unnecessarily obscuring the present invention.

In the following description, the various functions shall be discussed under topic headings that appear in the following order:

I. FUNCTIONAL OVERVIEW
II. TWO-STEP UNFILTERING AND FILTERING APPROACH
III. ONE-STEP DIFFERENCE FILTERING APPROACH
IV. EXAMPLES USING A SIMPLE FILTER
V. HARDWARE OVERVIEW
VI. EXTENSIONS AND ALTERNATIVES

I. Functional Overview

Techniques are provided for incrementally updating graphical images when using anti-aliasing techniques. The approaches described herein are explained using the concept of "negative colors" to understand the removal of the impact of old colors on filtered objects that are incrementally updated with a new color. "Negative colors" are based on the original, unfiltered color of the pixels for the filtered object. For example, for an original color that is represented by the value (0.3, 0, 0), a dark red, the negative color of the original color is represented by the value (−0.3, 0, 0).

As described herein, when the filtered object is incrementally updated by a graphics application to show a new color, both the original color and the new color are used to filter the object to preclude the appearance of the halo effect. According to one embodiment, the original color and new color are used in a two-step approach so that the object is first filtered using the negative color of the original color and then filtered again using the new color. According to another embodiment, the difference between the new color and the original color (e.g., difference color=new color−original color) is used in a one-step approach to filter the incrementally updated object.

Figure 1:
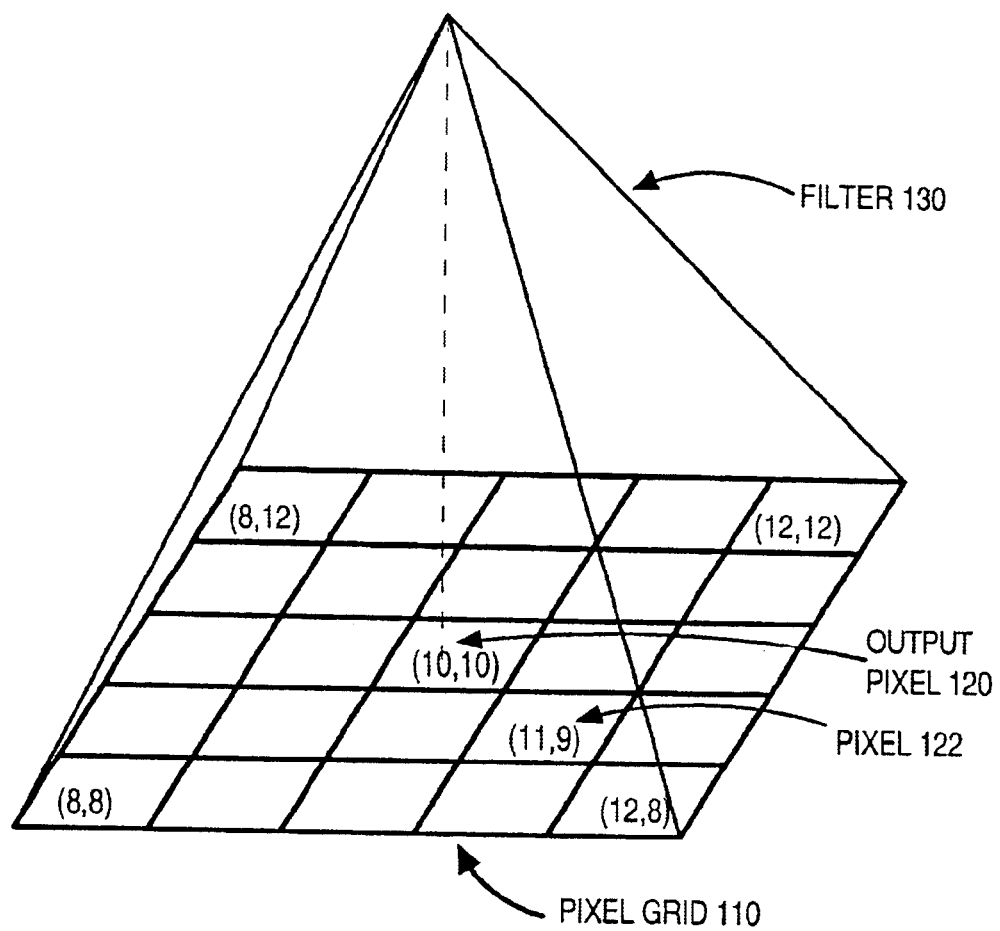
FIG. 1 is a diagram that depicts a pixel grid and a filter that are centered on an output pixel.
Figure 2:
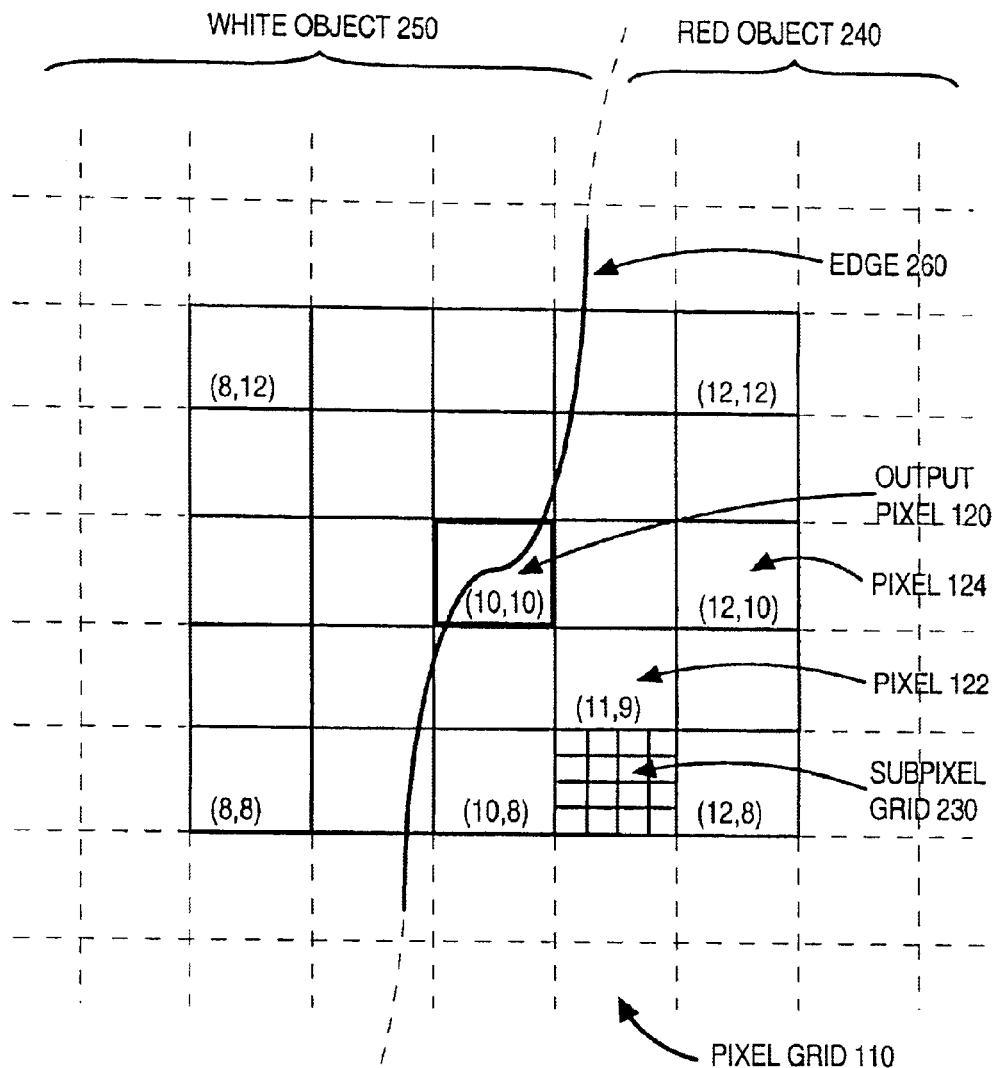
FIG. 2 is a diagram that depicts the pixel grid, a red object, a white object, and an edge between the red object and the white object.
Figure 3A:
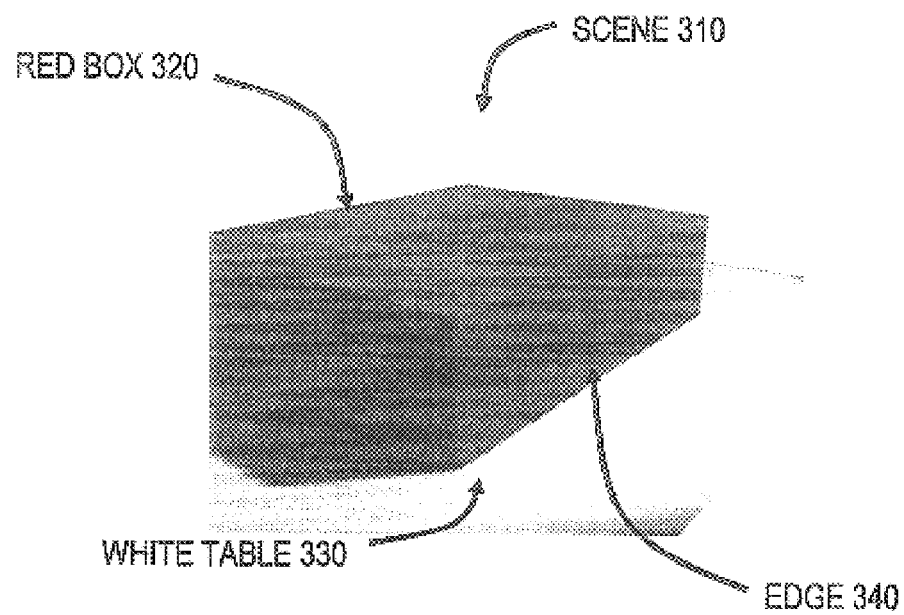
FIG. 3A is a diagram that depicts a scene that has been filtered.
Figure 3B:
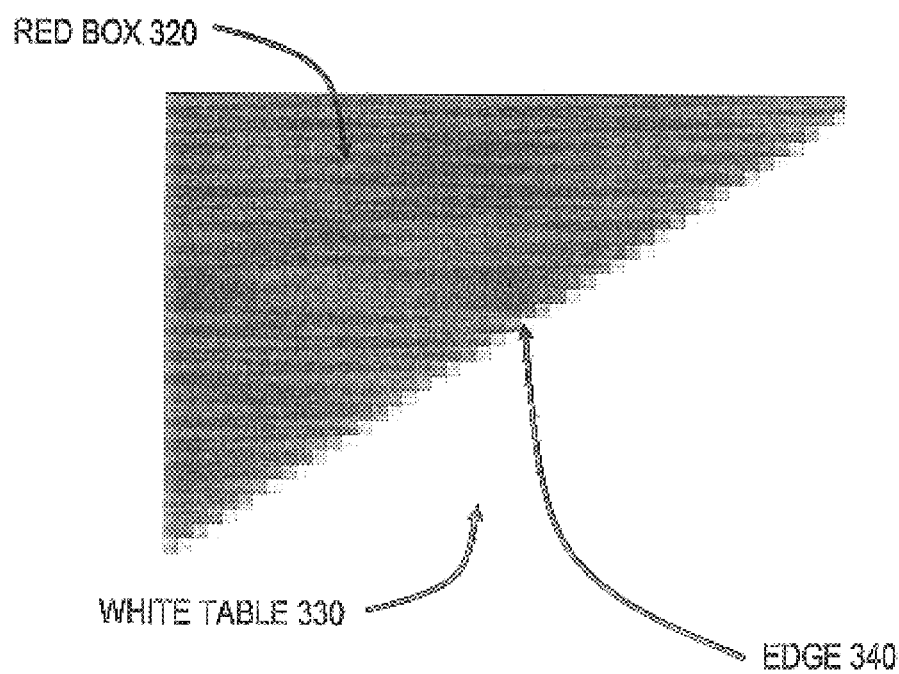
FIG. 3B is a diagram that depicts a magnified view of a portion of the edge of the red box after application of the filter to the red box.
Figure 4:
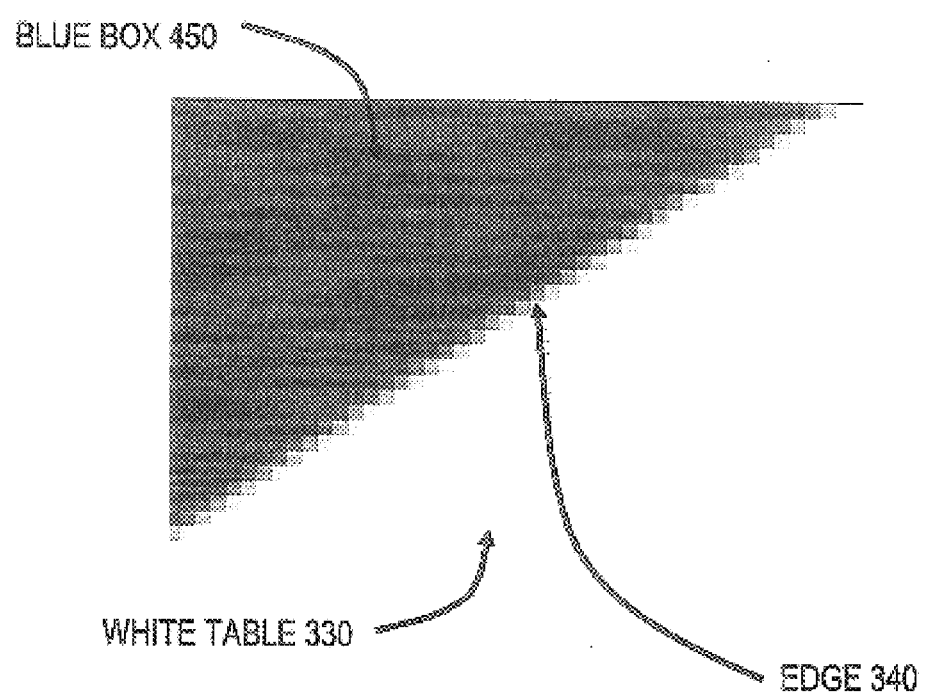
FIG. 4 is a diagram that depicts a magnified view of a portion of the edge of the blue box after application of the filter based on the original red color and the new blue color, according to one embodiment of the invention.

FIG. 4 is a diagram that depicts a magnified view of a portion of edge 340 of blue box 450 after application of the filter based on the original red color and the new blue color, according to one embodiment of the invention. FIG. 4 depicts edge 340 that was originally depicted between red box 320 and white table 330 in FIGS. 3A and 3B. However, in FIG. 4, edge 340 is depicted between blue box 450 and white table 330 after application of either the two-step or one-step approach described herein, which removes the purplish halo that occurs when one object of an image is incrementally updated with conventional approaches.

For clarity and convenience, the discussion herein is generally described in terms of objects of a raster image that have an original color and a new color. However, the techniques described may be applied to any type of image in which a part of the image is incrementally updated using an anti-aliasing filtering technique. An example of an incremental updating engine that uses anti-aliasing filtering techniques is ActiveShade that is included in 3d studio max® from Discreet®, a division of Autodesk, Inc.

Further, the techniques described herein may be applied to one object, a set of objects, or any portion of an image that may encompass part or all of one or more objects, including from one pixel to a group of pixels. Also, the techniques described herein are not limited to changes in pixels arising from changes of color. Any change that affects a visible attribute of a pixel when rendered and filtered may be accommodated, including but not limited to, changes in the materials, the textures, the shading layers, and/or the lighting sources that are used in an image.

II. Two-Step Unfiltering and Filtering Approach

According to one embodiment, a two-step approach is used to re-render an object: (1) unfiltering the object based on the original color and (2) filtering the object based on a new color. As discussed herein, the first step is a filtering step using a negative color that is determined from the original color. The second step uses a new color that arises from a modification of the object, such as from a modification of the object's color, material, or texture, or from a modification to the shading or lighting in the image.

Recall that conventionally the original color of a filtered object is discarded after filtering. However, for the two-step approach, the original color for each pixel of the object is stored as well as the filtering of the object. For example, the original color may be stored with the set of information that is associated with each fragment. In addition, if the sub-pixel mask for the fragment is not already included in the fragment information, the sub-pixel mask is stored, such as with the set of information that is associated with each fragment. The sub-pixel mask may be used to recreate the weights used in the previous filtering of the object.

Figure 5A:
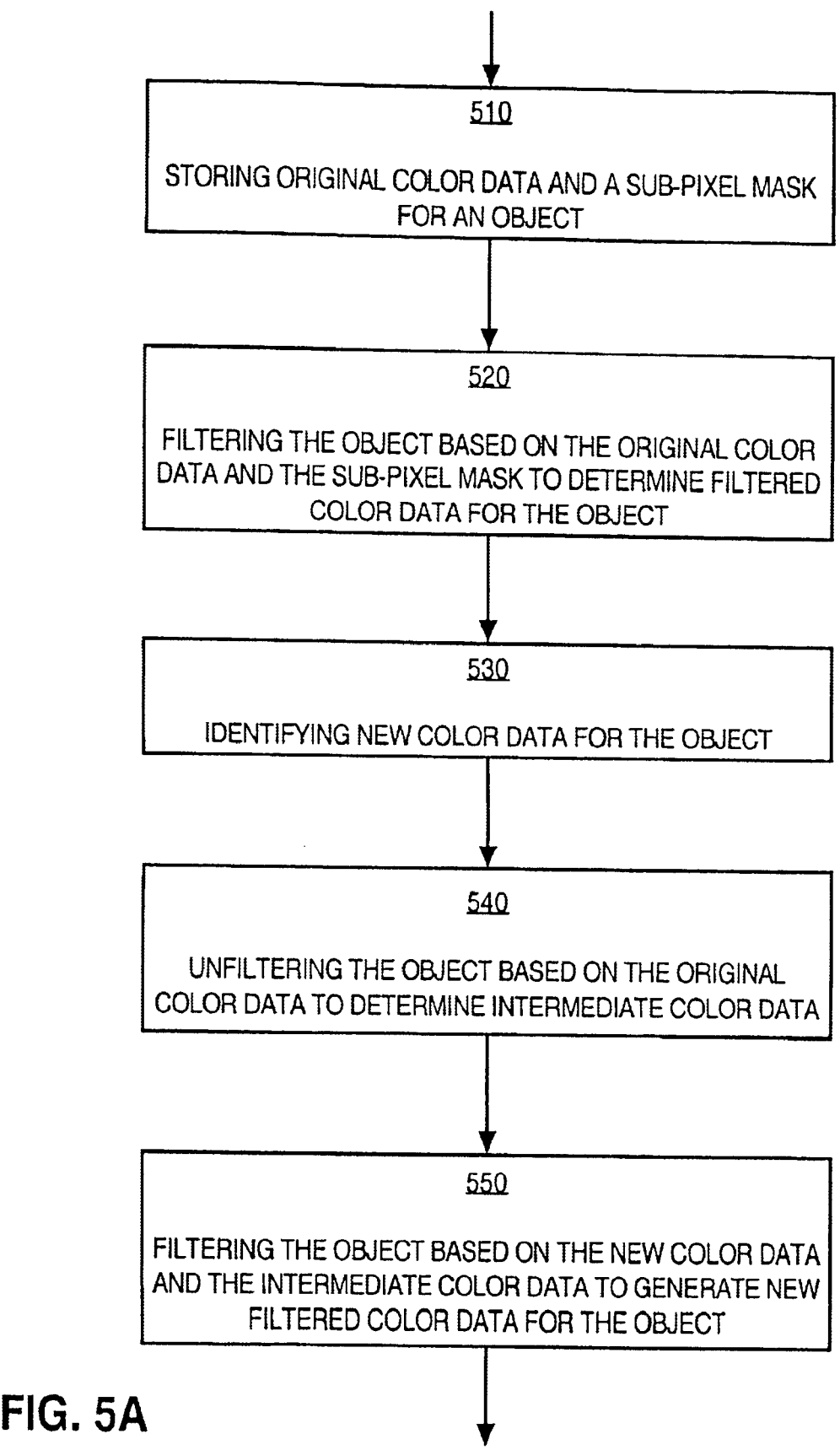
FIG. 5A is a logical flow diagram that depicts an approach for re-rendering a filtered object by unfiltering the object based on the original color and re-filtering the object based on a new color, according to one embodiment of the invention.

FIG. 5A is a logical flow diagram that depicts an approach for re-rendering a filtered object by unfiltering the object based on the original color and re-filtering the object based on a new color, according to one embodiment of the invention. Although FIG. 5A provides a particular set of steps in a particular order, other implementations may use more or fewer steps and a different order. Also, although the examples herein are described in terms of objects for which the color is changed, the techniques described may be applied to one or more filtered pixels having visible attributes that are impacted based on a variety of different changes.

In block 510, original color data and sub-pixel mask for an object is stored. For example, each fragment associated with the pixel may include a "previous color" or a "saved color" data item, along with the sub-pixel mask.

In block 520, the object is filtered based on the original color data and sub-pixel mask to determine filtered color data for the object. The filtered color data is used to represent the object in the image that a user sees. The filtering of the object may be part of a complete rendering of the image that includes the object, or the filtering of the object may be a re-rendering of part of the image that includes some or all of the object. For the purposes of explanation herein, the first filtering step of block 520 is described in terms of an "original" color to distinguish from the colors of the subsequent steps, even though the original color may reflect one or more color changes since the original creation of the object.

In block 530, new color data for the object is identified. For example, the graphical artist working with the image that contains the object may specify a new color for the object. In addition, the color, or more generally the "visible attributes," of the object may be affected by many changes. As used herein, a "visible attribute" is any characteristic, parameter, or other information that affects the appearance of an image, object, or pixel. For example, there may be a change in the material that is applied to the object, in the texture that is applied to the object, in the shading applied to the object, or in the lighting of the image. The graphical artist typically provides the material, texture, shading or lighting change, and the graphical application selects the portion of the raster image that is affected by the change. For an incremental updating application, only the portion of the raster image that are affected by the change in visible attributes are updated by re-rendering those selected parts of the raster image.

In block 540, the object is unfiltered based on the original color data to determine intermediate color data. With incremental updating, the remainder of the image beyond the object is not altered when the object is unfiltered. Other changes in the visible attributes of the image or computations besides unfiltering and re-filtering as described herein may be included as part of the re-rendering of the object, such as the application of a new texture, a modification of a material, or a shading change.

As used herein, the term "unfiltering" means that the original filtering of block 520 is in a sense reversed or undone to remove the contribution of the original color data to the filtered color data. Unfiltering may also be understood as applying a "negative filter" or applying the filter with a "negative color" to remove one or more visible attributes that were previously applied to an image, object, or pixel. The intermediate color data is used as the basis for block 550, as discussed below.

Unfiltering may be implemented as a filtering step that uses the negative color data of the original color data. For example, assume that for one pixel of the object the color is medium red and is represented by the value (0.5, 0, 0). The unfiltering step may be implemented as the filtering the object using "negative red" that is represented by the value (−0.5, 0, 0) and re-filtering the image. This has the effect of removing the red object from the filtered image, both near the object, where the original color of the object affected the final color of the pixel though the object did not geometrically cover that pixel, as well as pixels the object geometrically covered.

Because filter values may sometimes be negative in certain embodiments, filtering computations are performed with signed numbers. For example, filter weights or strengths may vary over a range of −1.0 to +1.0. However, for filtering computations, a 16 bit signed number may be used to represent a range of color values of +2.0 to −2.0. The final color values from the filtering computations are adjusted to be in the range of 0.0 to 1.0, which is typically the allowed range for "legal" color values. The use of a range of +2.0 to −2.0 for filtering computations, instead of a range of +1.0 to −1.0 can help minimize round-off and overflow errors that may occur when working with numbers close to ±1.0.

In block 550, the object is filtered based on the new color data and the intermediate color data that is determined in block 540 to generate new filtered color data for the object. For example, the new color data may be weighted according to the anti-aliasing technique and then added to the intermediate color that is determined in block 540.

The new filtered color data for the object is used to represent the object in the image that a user views. Because the object is the only part of the raster image being re-rendered, no other objects or portions of the raster image are filtered. The new color data may be stored and used as the "original" color data in a subsequent filtering of some or all of the image that includes the object.

The two-step unfiltering-filtering approach described above allows for the use of different filters for the original color and the new color. While the same anti-aliasing technique is typically used for an entire raster image, including incremental updates to the raster image, an original anti-aliasing technique may be used for the original filtering of block 510 and the unfiltering of block 540, while a different or new anti-aliasing technique may be used for the filtering in block 550 for the new color. In certain embodiments, the information stored for each fragment includes data that identifies the anti-aliasing technique last employed, thus ensuring that the unfiltering step of block 540 will use the same anti-aliasing technique as used in the original filtering of block 520.

III. One-Step Difference Filtering Approach

According to one embodiment, a one-step approach is used to re-render an object by filtering the object based on the difference between the new color and the original color. This "difference" approach is equivalent to describing the one step as filtering the object based on the combination of the new color and the negative of the original color. As discussed above, the filtering step uses a new color that arises from a change to the object, and the original color for each pixel of the object is stored as part of filtering the object.

Figure 5B:
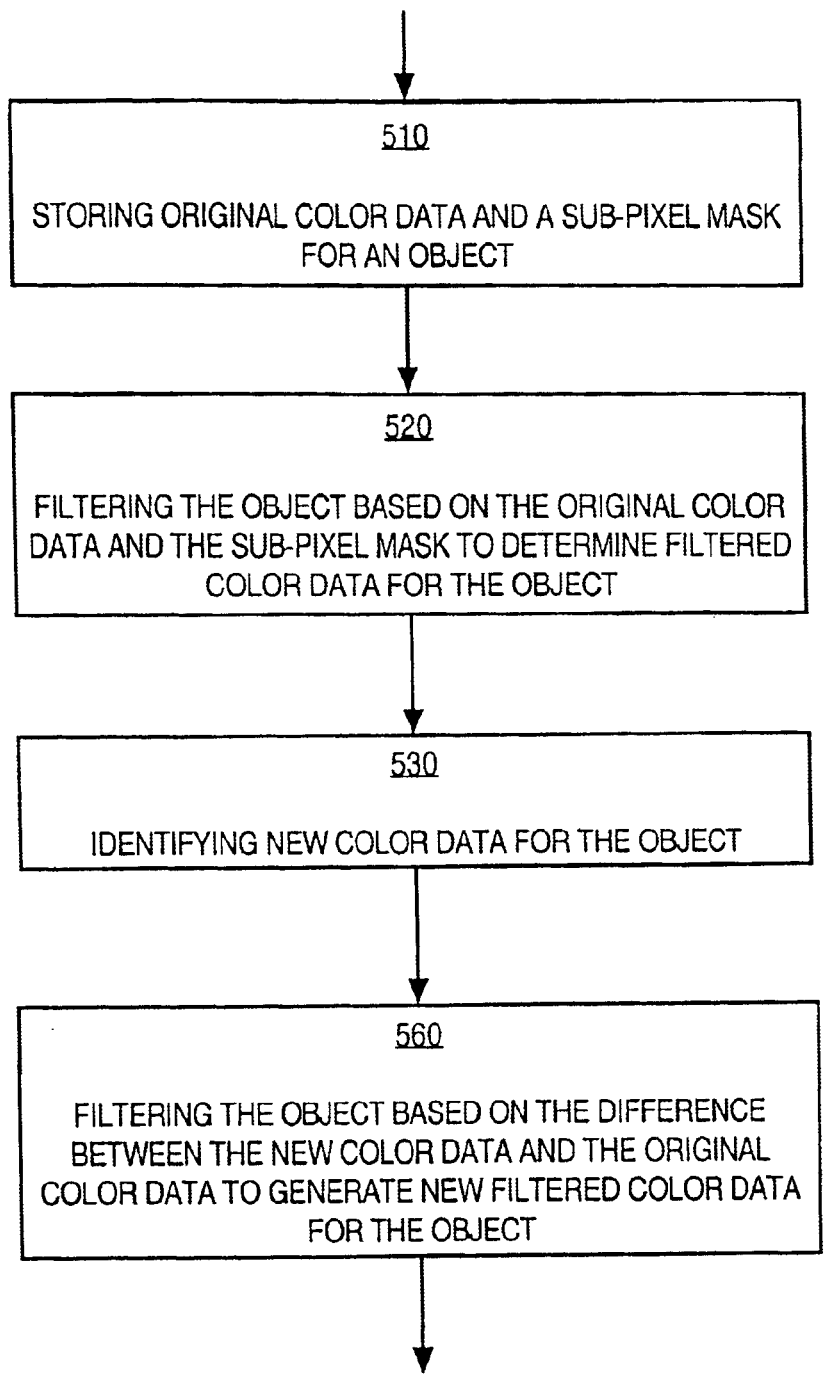
FIG. 5B is a logical flow diagram that depicts an approach for re-rendering a filtered object by filtering the object based on the difference between a new color and the original color, according to one embodiment of the invention.

FIG. 5B is a logical flow diagram that depicts an approach for re-rendering a filtered object by filtering the object based on the difference between a new color and the original color, according to embodiment of the invention. Although FIG. 5B provides a particular set of steps in a particular order, other implementations may use more or fewer steps and a different order. Also, as noted above, the examples herein are described in terms of objects for which the color is changed, although the techniques described may be applied to one or more filtered pixels for which the visible attributes are impacted by a variety of possible changes.

The steps shown in blocks 510, 520, and 530 are the same as those described above with reference to FIG. 5A and therefore are not repeated here. However, FIG. 5B depicts a single block 560 in place of blocks 540 and 550 of FIG. 5A.

In block 560, the object is filtered based on the difference between the new color data and the original color data to generate new filtered color data for the object. For example, the difference color may be weighted according to the anti-aliasing technique and the result added to the previous filtered pixel color to determine the new filtered pixel color. The effect of this combined operation is to replace all effects of the old object color with the new color. The same anti-aliasing filter is used for both the un-filtering and re-filtering processes, since these are combined into a single pass.

The new filtered color data for the object is used to represent the object in the image that a user views. Because the object is the only part of the raster image being re-rendered, no other objects or portions of the raster image are filtered. The new color data may be stored and used as the "original" color data in a later filtering of just the object or of some or all of the raster image.

The one-step approach of filtering based on the difference between the new color and the old color can produce the same results as to the two-step approach of unfiltering based on the original color and then filtering based on the new color. By filtering specified portions of an image based on an original color and a new color for each pixel or sub-pixel, the rendering engine can incrementally update the corresponding pixels without the appearance of the halo effect.

IV. Examples Using a Simple Filter

For purposes of simplification, the examples and discussion in this section illustrate a single pixel that is half covered by a left object and half covered by a right object. The filtering examples are based on a simple cylindrical filter that has a radius of one half of a pixel and that is centered on the pixel. Therefore, the simple cylindrical filter covers only the single pixel and all colors within the pixel are weighted equally (i.e., the different colors of the two halves of the pixel may be averaged to determine a final filtered color). However, the examples and discussion of this section may be generalized to situations that involve pixels that are covered by a single or multiple objects in differing proportions, and/or smaller or larger filters that cover multiple pixels that that have differing weights. Also, while the examples of this section filter at the pixel level of resolution, the sub-pixel level of resolution may also be used when filtering.

To simplify the discussion, only one pixel is described, although in practice many or all of the pixels in either one or both objects may be filtered as described herein. The change to the object in this example is assumed to be a change in color, although the change may arise due to other changes in any visible attributes, such as from alterations of the shading, lighting, texture, or material, and the change may affect part of all of an object, a set of objects, or any portion of the image.

Figure 6A:
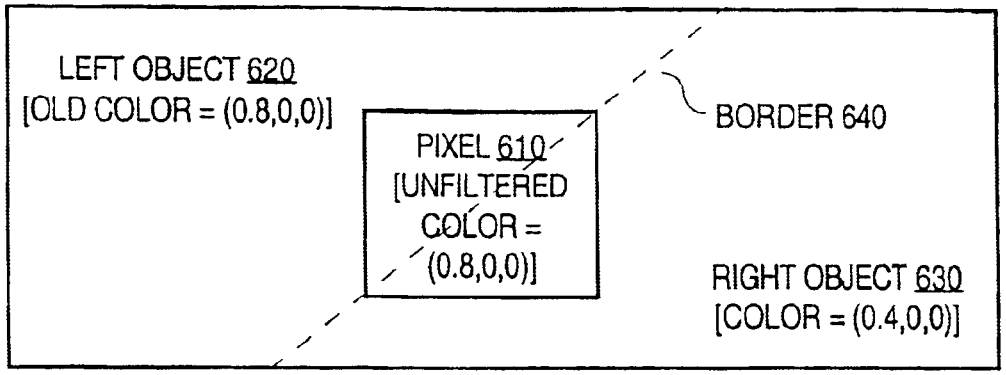
FIG. 6A is a diagram that depicts an image that has not been filtered.

FIG. 6A is a diagram that depicts an image 600 that has not been filtered. Image 600 includes a left object 620 having a color represented by the value (0.8, 0, 0) and a right object 630 having a color represented by the value (0.4, 0, 0). A border 640 separates left object 620 from right object 630. A pixel 610 is evenly divided by border 640 such that left object 620 covers the upper left half of pixel 610 and right object 630 covers the lower right half of pixel 610.

The color to be associated with pixel 610 before any filtering is performed may be selected in a variety of ways. For example, the color for pixel 610 may be the color of the object that covers the largest portion of pixel 610. However, in FIG. 6A, pixel 610 is evenly covered by left object 620 and right object 630, although in practice two objects are not likely to exactly cover half of a pixel. Nevertheless, in this example, another approach may be used, such as selecting the color of the object that is on top of, or in front of, the other object or objects. Assume here that left object 620 is in front of right object 630 in the scene shown by image 600. Therefore, the color for pixel 610 is (0.8, 0, 0), the same color as for left object 620.

Figure 6B:
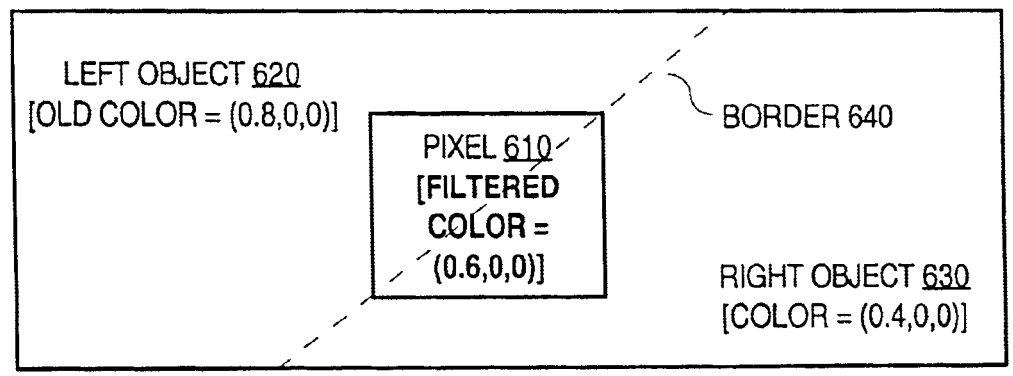
FIG. 6B is a diagram that depicts the image after filtering all of the image.

FIG. 6B is a diagram that depicts image 600 after filtering all of image 600. The only difference between FIG. 6B and FIG. 6A is that pixel 610 is now associated with a filtered color of (0.6, 0, 0) instead of the original unfiltered color of (0.8, 0, 0). The filtered color of (0.6, 0, 0) for pixel 610 is determined according to the cylindrical filter having uniform weights and a radius of one half of a pixel as assumed for this example. Therefore, because left object 620 and right object 630 each cover half of pixel 610, the filtered color for pixel 610 is just the average of the color for left object 620 and right object 630. However, if left object 620 and right object 630 covered different proportions of pixel 610, then the color for each of the objects would be weighted by how much of pixel 610 is covered by that object. Further, if more than two objects were covering pixel 610, then the colors for some or all of the objects may be similarly weighted to determine the filtered color for pixel 610.

The following expressions show how the filtered color for pixel 610 is determined when left object 620 and right object 630 each cover half of pixel 610 as depicted in FIG. 6B:

Filtered Color=½[old left color+right color].
=½[(0.8, 0, 0)+(0.4, 0, 0)]
=½[(1.2, 0, 0)]
=(0.6, 0, 0)

When image 600 is filtered as discussed herein with respect to FIG. 6B, the color used for pixel 610 is (0.6,0, 0) instead of the unfiltered color of (0.8,0, 0) from FIG. 6A. As a result of blending the colors for the two objects, border 640 will appear as a smooth edge instead of a jagged edge.

Figure 6C:
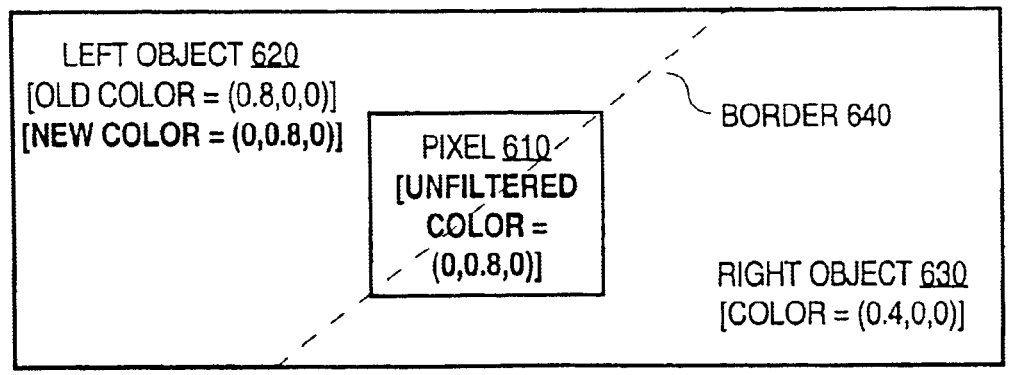
FIG. 6C is a diagram that depicts the image after changing the color of the left object without any additional filtering.

FIG. 6C is a diagram that depicts image 600 after changing the color of left object 620 without any additional filtering. While left object 620 had a color of (0.8, 0, 0) in FIGS. 6A and 6B, left object 620 now has a color of (0, 0.8, 0) in FIG. 6C. If no filtering is applied to image 600 after the change in color to left object 620, the color for pixel 610 is chosen as described above. Thus, because left object 620 is assumed to be in front of right object 630, the unfiltered color for pixel 610 is (0, 0.8, 0), the same as that for left object 620. Recall that without filtering, the halo effect does not appear if there is no additional filtering. However, without filtering, the edges of objects will appear jagged.

Figure 6D:
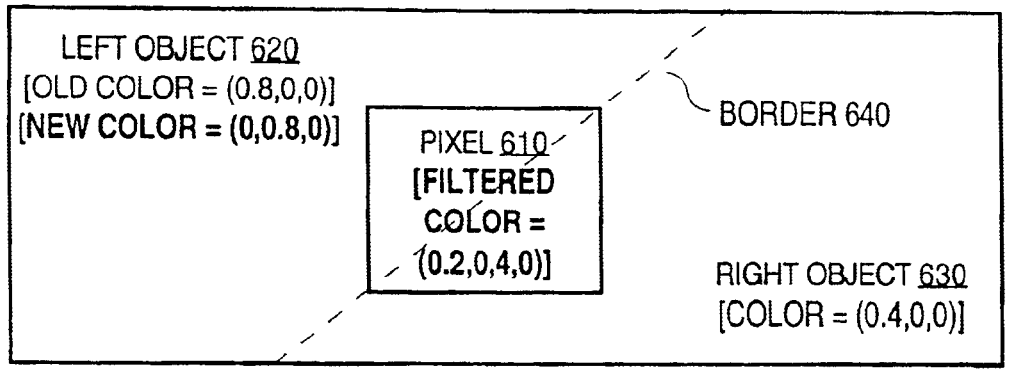
FIG. 6D is a diagram that depicts the image after changing the color of the left object after filtering all of the image.

FIG. 6D is a diagram that depicts image 600 after changing the color of left object 620 after filtering all of image 600. Filtering of all of image 600 based on the new color of (0, 0.8, 0) for left object 620 involves the same approach as that of filtering all of image 600 based on the old color of (0.8, 0, 0) for left object 620, as discussed above with respect to FIG. 6A.

The following expressions show how the filtered color for pixel 610 is determined after the color for left object 620 is changed to (0, 0.8, 0) as depicted in FIG. 6D:

Filtered Color=½ [new left color+right color]
=½[(0, 0.8, 0)+(0.4, 0, 0)]
=½[(0.4, 0.8, 0)]
=(0.2, 0.4, 0)

Recall that when the entire image is filtered (as compared to just filtering a portion of the image, such as just the object with the color change), the halo effect does not appear. However, the re-filtering of the entire image 600 involves considerable computations even though the only change is to the color for left object 620. The filtered color of (0.2, 0.4, 0) for pixel 610 in FIG. 6D may be called the "correct color" because there is no halo effect and the result is the same as if the entire image is filtered.

Figure 6E:
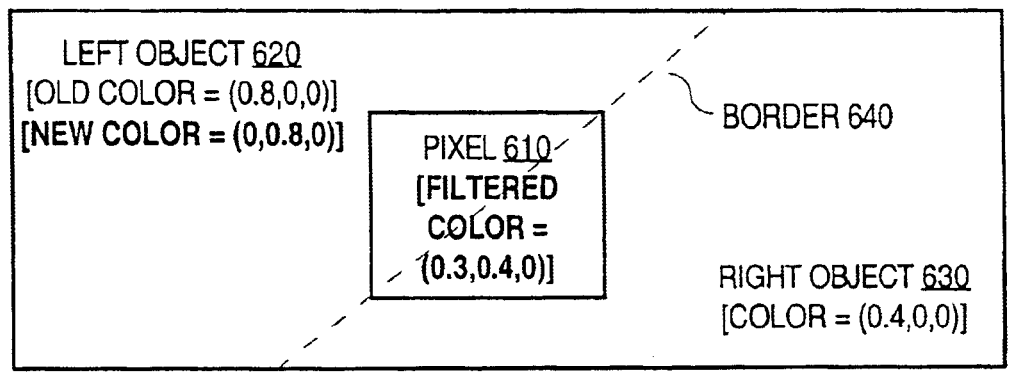
FIG. 6E is a diagram that depicts the image after changing the color of the left object and after filtering only the left object instead of filtering all of the image.

FIG. 6E is a diagram that depicts image 600 after changing the color of left object 620 and after filtering only left object 620 instead of filtering all of image 600. Recall that with incremental updating, only the affected portion of an image is updated. In the H example of FIG. 6E, left object 620 is incrementally updated, and therefore only fragments for the left object 620 are created. The problem that gives rise to the halo effect in FIG. 6E is that the old color information for left object 620 and right object 630 are not saved. The only color information available for filtering pixel 610 is the previous filtered color of (0.6, 0, 0) for pixel 610 and the new color of (0, 0.8, 0) for left object 620. Color information from right object 630 is not available because right object 630 is not being updated when left object 620 is incrementally updated.

The following expressions show how the filtered color for pixel 610 is determined after the color for left object 620 is changed to (0, 0.8, 0) and only the previous filtered color for pixel 610 is available from the previous filtered image:

Filtered Color=½[new left color+previous filtered pixel color]
=½[(0, 0.8, 0)+(0.6, 0, 0)]
=½[(0.6, 0.8, 0)]
(0.3, 0.4, 0)

The difference between the result of (0.3, 0.4, 0) for pixel 610 when only left object 620 is filtered, as with incremental updating, and the "correct color" of (0.2, 0.4, 0) from FIG. 6D (which is (0.1, 0, 0) in this case) is what gives rise to the halo effect. The use of the previous filtered pixel color, which is based in part on the old color of (0.8, 0, 0) for left object 620, carries over into the new filtered color of (0.3, 0.4, 0) for pixel 610.

Figure 6F:
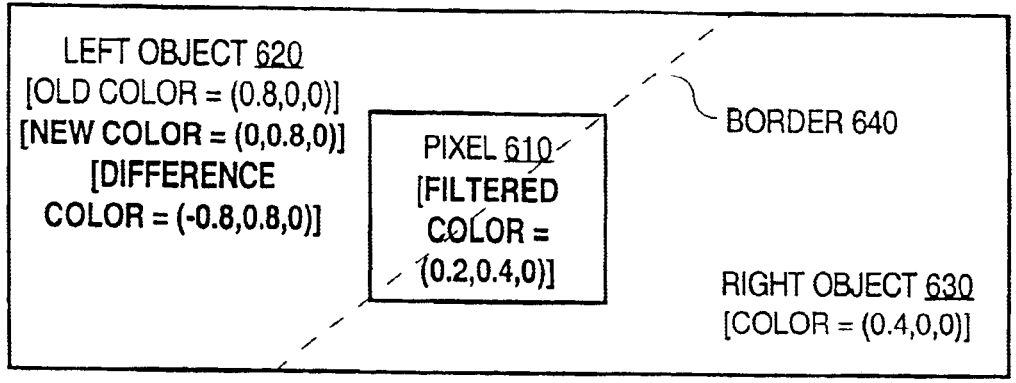
FIG. 6F is a diagram that depicts the image after changing the color of the left object with one-step filtering of only the left object, according to one embodiment of the invention.

FIG. 6F is a diagram that depicts image 600 after changing the color of left object 620 with one-step filtering of only left object 620, according to one embodiment of the invention. Recall that the one-step filtering approach uses the difference color between the new color and the old color for the object being incrementally updated, and the old color data for each fragment is saved as part of the information for each fragment.

In FIG. 6F, the old color for left object 620 is (0.8, 0, 0) and the new color is (0, 0.8, 0), resulting in a difference color of (−0.8, 0.8, 0). To determine the new filtered color for pixel 610, the difference color is applied based on the filter used and then added to the previous filtered color. In this example, the difference color is weighted based on the portion of pixel 610 that is covered by left object 620, which is half in this example. The resulting value is added to the previous pixel color of (0.6, 0, 0) from FIG. 6B, which was determined prior to the color change for left object 620.

The following expressions show how the filtered color for pixel 610 is determined after the color for left object 620 is changed from (0.8, 0, 0) to (0, 0.8, 0) based on the one-step difference filtering approach as depicted in FIG. 6F:

Filtered Color=[previous pixel color]+[object weight]×[difference color]
=(0.6, 0, 0)+(0.5)×[(0, 0.8, 0)−(0.8, 0, 0)]
=(0.6, 0, 0)+(0.5)×[(−0.8, 0.8, 0)]
=(0.6, 0, 0)+(−0.4, 0.4, 0)
=(0.2, 0.4, 0)

Thus, the result of (0.2, 0.4, 0) for the one-step difference filtering approach is the "correct color" as determined above with respect to FIG. 6D. However, for the example of FIG. 6F, only the left object is re-rendered and re-filtered, whereas in FIG. 6D, all of image 600 was re-rendered and re-filtered. Therefore, the use of the one-step difference filtering approach allows for left object 620 to be incrementally updated without producing the halo effect.

Figure 6G:
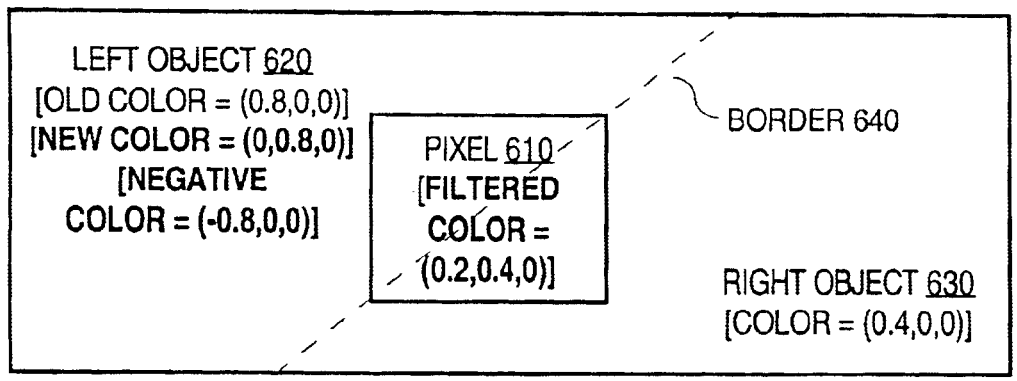
FIG. 6G is a diagram that depicts the image after changing the color of the left object with two-step filtering of only the left object, according to one embodiment of the invention.

FIG. 6G is a diagram that depicts image 600 after changing the color of left object 620 with two-step filtering of only left object 620, according to one embodiment of the invention. To determine the new filtered color for pixel 610, the first step is to apply the negative of the old color based on the filter used and then add the result to the previous filtered color. The second step is to apply the new color based on the filter used and then add the result to the result of the first step.

In this example, the first step is to determine the negative old color based on the stored color data for the fragment. Here, the old color is (0.8, 0, 0), so the negative old color is (−0.8, 0, 0). The negative old color is then weighted based on the filter. In this example, the portion of pixel 610 that is covered by left object 620 is half. The resulting value is added to the previous pixel color of (0.6, 0, 0) from FIG. 6B, which was determined prior to the color change for left object 620. Then the second step is to use the new color of (0, 0.8, 0) and weight the new color based on the filter, which means the half of pixel 610 that is covered by left object 620 here, and then add the result to the value from the first step.

The following expressions show how the filtered color for pixel 610 is determined after the color for left object 620 is changed from (0.8, 0, 0) to (0, 0.8, 0) based on the two-step filtering approach as depicted in FIG. 6G:

First Step for Filtered Color=[previous pixel color]+[object weight]×[negative old color]
=(0.6, 0, 0)+(0.5)×[−(0.8, 0, 0)]
=(0.6, 0, 0)+(−0.4, 0, 0)
=(0.2, 0, 0)

Second Step for Filtered Color=[value from step one]+[object weight]×[new color]
=(0.2,0,0)+(0.5)×[(0,0.8,0)]
=(0.2, 0, 0)+(0, 0.4, 0)
=(0.2, 0.4, 0)

Thus, the result of (0.2, 0.4, 0) for the two-step difference filtering approach is the correct color as determined above with respect to FIG. 6D. However, for the example of FIG. 6G, only the left object is re-rendered and re-filtered, whereas in FIG. 6D, all of image 600 was re-rendered and re-filtered. Therefore, the use of the two-step difference filtering approach allows for left object 620 to be incrementally updated without producing the halo effect.

In addition, the use of the two-step filtering approach allows for a change between the filter used in the original filtering and the subsequent filtering. By using the original filter in the first step for filtering based on the negative of the old color, a different filter can be used in the second step for filtering based on the new color.

V. Hardware Overview

Figure 7:
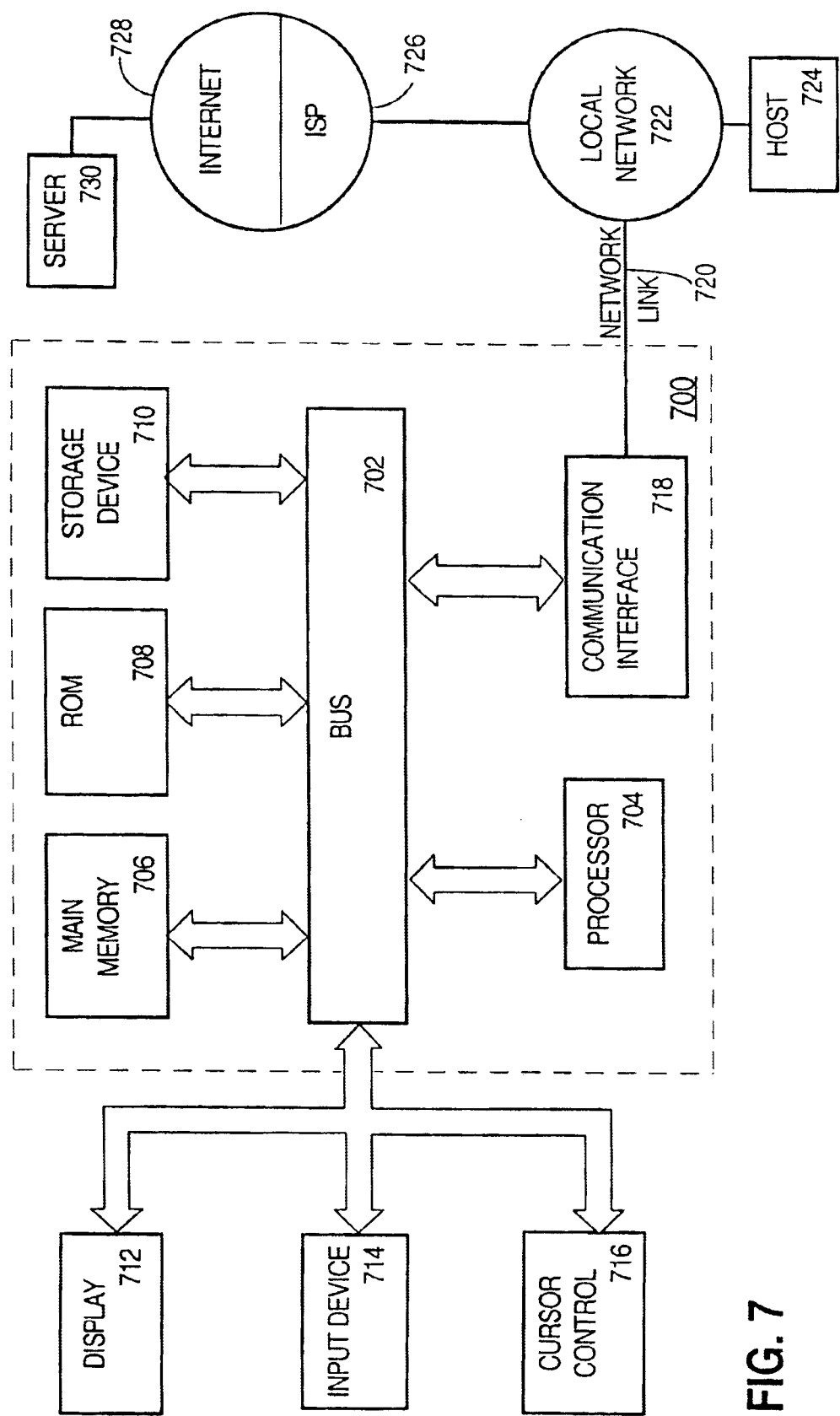
FIG. 7 is a block diagram that depicts a computer system upon which embodiments of the invention may be implemented.

FIG. 7 is a block diagram that depicts a computer system 700 upon which embodiments of the invention may be implemented. Computer system 700 includes a bus 702 or other communication mechanism for communicating information, and a processor 704 coupled with bus 702 for processing information. Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

The invention is related to the use of computer system 700 for implementing the techniques described herein. According to one embodiment of the invention, those techniques are performed by computer system 700 in response to processor 704 executing one or more sequences of one or more instructions contained in main memory 706. Such instructions may be read into main memory 706 from another computer-readable medium, such as storage device 710. Execution of the sequences of instructions contained in main memory 706 causes processor 704 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 704 for execution. Such a medium may take many forms, including but not limited to, non-volatile media, volatile media, and transmission media. Non-volatile media includes, for example, optical or magnetic disks, such as storage device 710. Volatile media includes dynamic memory, such as main memory 706. Transmission media includes coaxial cables, copper wire and fiber optics, including the wires that comprise bus 702. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are exemplary forms of carrier waves transporting the information.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution. In this manner, computer system 700 may obtain application code in the form of a carrier wave.

VI. Extensions and Alternatives

In the foregoing specification, the invention has been described with reference to specific embodiments thereof. It will, however, be evident that various modifications and changes may be made thereto without departing from the broader spirit and scope of the invention. Thus, the specification and drawings are, accordingly, to be regarded in an illustrative rather than a restrictive sense. The invention includes other contexts and applications in which the mechanisms and processes described herein are available to other mechanisms, methods, programs, and processes.

In addition, in this disclosure, certain process steps are set forth in a particular order, and alphabetic and alphanumeric labels are used to identify certain steps. Unless specifically stated in the disclosure, embodiments of the invention are not limited to any particular order of carrying out such steps. In particular, the labels are used merely for convenient identification of steps, and are not intended to imply, specify or require a particular order of carrying out such steps.

What is claimed is:

1. A method for generating an image that is associated with a plurality of pixels, the method comprising the computer-implemented steps of:

filtering, based on a fit set of data that is associated with a first group of pixels of the plurality of pixels, the first group of pixels to determine a second set of data that is associated with the first group of pixels;

identifying a third set of data that is associated with a second group of pixels of the first group of pixels, the second group of pixels defined responsive to an alteration affecting a visible attribute of the second group of pixels; and filtering, based on the first set of data aid the second set of data and the third set of data, the second group of pixels to determine a fourth set of data that is associated with the second group of pixels.

2. The method of claim 1, former comprising the computer-implemented step of:

storing the first set of data that is associated with the first group of pixels of the plurality of pixels.

3. The method of claim 1, wherein the second group of pixels includes one or more pixels but not all pixels of the first group of pixels.

4. The method of claim 1, wherein the step of filtering the second group of pixels includes the computer-implemented step of:
- filtering, based on the second set of data and one or more differences between the third set of data and the first set of data, the second group of pixels to determine the fourth set of data.

5. The method of claim 1, wherein the step of filtering the second group of pixels includes the computer implemented step of:
- filtering, based on the second set of data and a negative first set of data that is based on the first set of data, the second group of pixels to determine the four set of data.

6. The method of claim 1, wherein the first set of data is a first set of visible attribute data, the second set of data is a second set of visible attribute data, and wherein the step of filtering the second group of pixels includes the computer implemented steps of:
- generating a negative first set of visible attribute data based on the first set of visible attribute data; and
- filtering, based on the second set of visible attribute data and the negative first set of visible attribute data, the second group of pixels to determine the fourth set of data.

7. The method of claim 4, wherein the third set of data includes a fist plurality of values, wherein the first set of data includes a second plurality of values, and wherein step of filtering the second group of pixels includes the computer-implemented step of:
- determining a plurality of difference values, wherein each difference value is determined by subtracting a value of the second plurality of values from a corresponding value of the first plurality of values.

8. The method of claim 1, wherein the step of filtering the second group of pixels includes the computer-implemented step of:
- unfiltering, based on the first set of data and the second set of data, the second group of pixels to determine a fifth set of data that is associated with the second group of pixels; and
- filtering, based on the fifth set of data and the third set of data, the second group of pixels to determine the fourth set of data.

9. The method of claim 8, wherein the step of unfaltering the second group of pixels includes the computer implemented step of:
- filtering, based on the second set of data and a negative first set of data that is based on the first set of data, the second group of pixels to determine the fifth set of data.

10. The method of claim 8, wherein the first set of data is a first set of visible attribute data, the second set of data is a second set of visible attribute data, and wherein the step of unfaltering the second group of pixels includes the computer-implemented steps of:
- generating a negative first set of visible attribute data based on the first set of visible attribute data; and
- filtering, based on the second set of visible attribute data and the negative first set of visible attribute data, the second group of pixels to determine a fifth set of visible attribute data.

11. The method of claim 10, wherein the negative first set of visible attribute data includes a first plurality of values, wherein the first set of visible attribute data includes a second plurality of values, and wherein the step of generating the negative first set of visible attribute data includes the computer implemented steps of:
- determining each value of the first plurality of values by making each value of the second plurality of values negative.

12. The method of claim 1, wherein the step of filtering the first group of pixels includes the computer implemented step of:
- applying a first anti-aliasing technique to the first group of pixels.

13. The method of claim 12, wherein the step of filtering the second group of pixels includes the computer implemented step of:
- applying a second anti-aliasing technique to the second group of pixels.

14. The method of claim 13, wherein the second anti-aliasing technique is the first anti-aliasing technique.

15. The method of claim 12, wherein the step of filtering the second group of pixels includes the computer implemented steps of:
- reversing the applying of the first anti-aliasing technique to the second group of pixels; and
- applying a second anti-aliasing technique to the second group of pixels.

16. The method of claim 15, wherein the second anti-aliasing technique is the first anti-aliasing technique.

17. The method of claim 15, wherein the second anti-aliasing technique is different than the first anti-aliasing technique.

18. The method of claim 1, wherein the first group of pixels includes all pixels of the plurality of pixels.

19. The method of claim 1, wherein the first group of pixels does not include all pixels of the plurality of pixels.

20. The method of claim 1, wherein:
- the plurality of pixels comprise a plurality of objects; and
- the second group of pixels comprises at least one object but not all objects of the plurality of objects.

21. The method of claim 1, wherein the second group of pixels is defined by input from a user.

22. The method of claim 1, wherein the step of identifying the third set of data that is associated with the second group of pixels includes the computer-implemented step of:
- receiving input that specifies the third set of data.

23. The method of claim 1, wherein the step of identifying the third set of data is associated with the second group of pixels includes the computer-implemented step of:
- receiving input that specifies one or more visible attributes for the second group of pixels; and
- determining the third set of data based on the one or more visible attributes.

24. The method of claim 1, wherein the step of identifying the third set of data that is associated with the second group of pixels includes the computer-implemented step of:
- receiving input that updates a set of material data that is associated with a material that is used in the image;
- selecting the second group of pixels from the first group of pixels by identifying which pixels of the first group of pixels are associated with the material; and
- determining the third set of data based on the set of material data.

25. The method of claim 1, wherein the step of identifying the third set of data that is associated with the second group of pixels includes the computer-implemented step of:
- receiving input that updates a set of shading data that is associated with a shading layer that is used in the image; and
- selecting the second group of pixels from the first group of pixels by identifying which pixels of the first group of pixels are associated with the shading layer; and determining the third set of data based on the set of shading data.

26. The method of claim 1, wherein:
the first set of data specifies a first set of visible attribute data for the first group of pixels;
the second set of data specifies a second set of visible attribute data for the first group of pixels;
the third set of data specifies a third set of visible attribute data for the second group of pixels; and
the fourth set of data specifies a fourth set of visible attribute data for the second group of pixels.

27. The method of claim 26, wherein:
the first set of visible attribute data identifies one or more colors for the first group of pixels;
the second set of visible attribute data identifies one or more colors for the first group of pixels;
the third set of visible attribute data identifies one or more colors for the second group of pixels; and
the fourth set of visible attribute data identifies one or more colors for the second group of pixels.

28. A method for updating an image, the method comprising the computer-implemented steps of:
applying a first set of visible attribute data to a pixel associated with the image;
storing the first set of visible attribute data;
applying a first filter to the pixel, wherein the first filter causes a first change to the pixel based on the first set of visible attribute data;
determining a second set of visible attribute data responsive to input from a user that affects a visible attribute of the pixel; and
applying a second filter to the pixel, wherein the second filter causes a second change to the pixel based on the first set of visible attribute data, the second set of visible attribute data, and the first change to the pixel.

29. The method of claim 28, wherein the step of applying the second filter includes the computer-implemented step of:
applying the second filter, wherein the second filter cases the second change to the pixel based on the first change to the pixel and on one or more differences between the first set of visible attribute data and the second act of visible attribute data.

30. The method of claim 28, wherein the step of applying the second filter includes the computer-implemented steps of:
applying the first filter, wherein the first filter causes a third change to the pixel based on the first set of visible attribute data and the first change to the pixel; and
applying the second filter, wherein the second filter causes the second change to the pixel based on the second set of visible attribute data and the third change.

31. The method of claim 28, wherein the image comprises a plurality of pixels, wherein the plurality of pixels comprises a subset of pixels that includes at least the pixel but less than all of the plurality of pixels; and wherein the step of applying the second filter to the pixels comprises the computer-implemented step of:
applying the second filter to the subset of pixels, wherein the second filter causes the second change to the pixel based on said first set of visible attribute data, the second set of visible attribute data, and the first change to the pixel.

32. An apparatus for generating an image that is associated with a plurality of pixels, the apparatus comprising:
a first filter that is applied, based on a first set of data that is associated with a first group of pixels of the plurality of pixels, to the first group of pixels to determine a second set of data that is associated with the first group of pixels;
an identification mechanism that identifies a third set of data that is associated with a second group of pixels of the first group of pixels, the second group of pixels defined responsive to an alteration affecting a visible attribute of the second group of pixels; and
a second filter that is applied, based on the first set of data and the second set of data and the third set of data, to the second group of pixels to obtain a fourth set of data that is associated with the second group of pixels.

33. A system for updating an image, the system comprising:
a first mechanism for storing a first set of visible attribute data that is applied to a pixel associated with the image;
a first filter, wherein applying the first filter to the pixel causes a first change to the pixel based on the first set of visible attribute data;
a second mechanism for determining a second set of visible attribute data responsive to input from a user that affects a visible attribute of the pixel; and
a second filter, wherein applying the second filter to the pixel causes a second change to the pixel based on the first set of visible attribute data, the second set of visible attribute data, and the first change to the pixel.

34. A computer-readable medium carrying one or more sequences of instructions for generating an image that is associated with a plurality of pixels, wherein execution of the one or more sequences of instructions by one or more processors causes the one or more processors to perform the steps of:
filtering, based on a first set of data that is associated with a first group of pixels of the plurality of pixels, the first group of pixels to determine a second set of data that is associated with the first group of pixels;
identifying a third set of data that is associated with a second group of pixels of the first group of pixels, the second group of pixels defined responsive to an alteration affecting a visible attribute of the second group of pixels; and
filtering, based on the first set of data and the second set of data and the third set of data, the second group of pixels to determine a fourth set of data that is associated with the second group of pixels.

35. A computer-readable medium carrying one or more sequences of instructions for updating an image, wherein execution of the one or more sequences of instructions by one or more processor causes the one or more processors to perform the steps of applying a first set of visible attribute data to a pixel associated with the image;
storing the first set of visible attribute data;
applying a first filter to the pixel, wherein the first filter causes a first change to the pixel based on the first set of visible attribute data;
determining a second set of visible attribute data responsive to input from a user that affects a visible attribute of the pixel; and
applying a second filter to the pixel, wherein the second filter causes a second change to the pixel based on the first set of visible attribute data, the second set of visible attribute data, and the first change to the pixel.

* * * * *

UNITED STATES PATENT AND TRADEMARK OFFICE
CERTIFICATE OF CORRECTION

PATENT NO. : 6,947,058 B1
DATED : September 20, 2005
INVENTOR(S) : Kells A. Elmquist It is certified that error appears in the above-identified patent and that said Letters Patent is hereby corrected as shown below:

Column 16,
Line 48, replace "fit" with -- first --.
Line 57, replace "aid" with -- and --.
Line 61, replace "former" with -- further --.

Column 17,
Line 13, replace "four" with -- fourth --.

Column 19,
Line 41, replace "cases" with -- causes --.
Line 44, replace "act" with -- set --.

Signed and Sealed this

Twenty-ninth Day of November, 2005

JON W. DUDAS
*Director of the United States Patent and Trademark Office*